Aug. 21, 1928.
H. E. BECK
1,681,907
VARIABLE CONDENSER
Filed Oct. 31, 1924    2 Sheets-Sheet 2
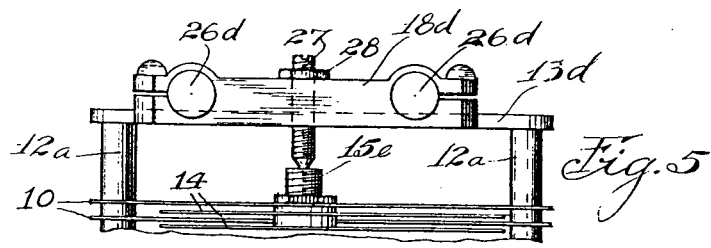
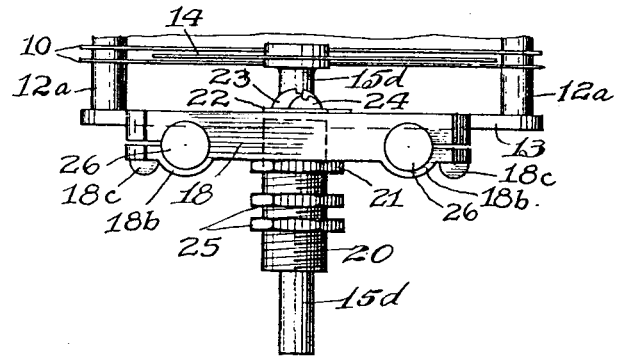
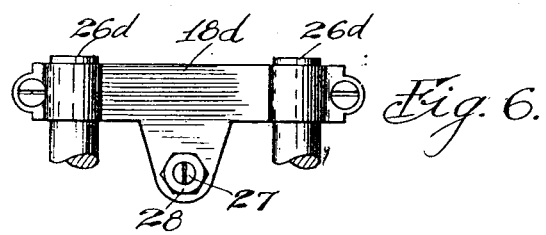
INVENTOR.
Harold E. Beck.
BY Albert E. Bee
ATTORNEY.

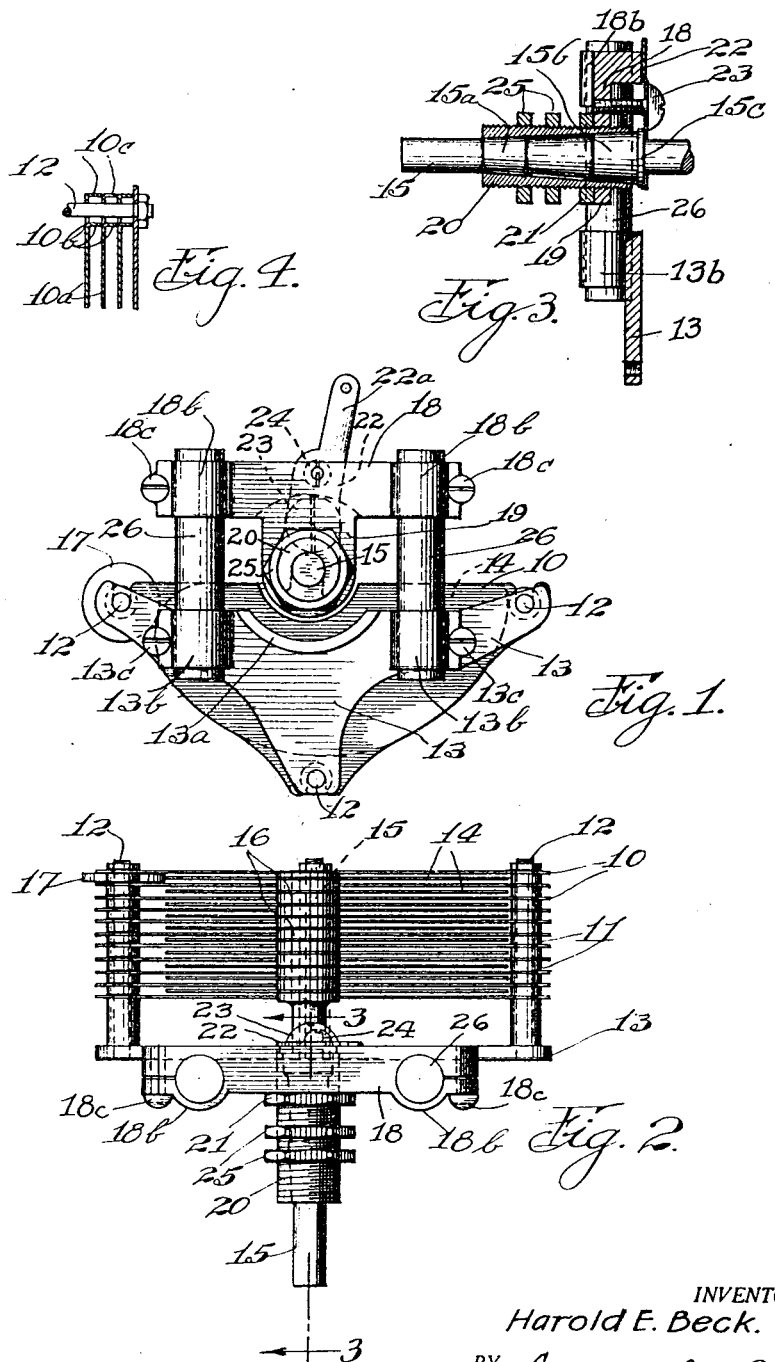

Patented Aug. 21, 1928.

1,681,907

UNITED STATES PATENT OFFICE.

HAROLD E. BECK, OF CHICAGO, ILLINOIS.

VARIABLE CONDENSER.

Application filed October 31, 1924. Serial No. 746,923.

My invention relates to an improved construction of variable condenser intended particularly for use in radio work. My variable condenser construction is of the type in which there are two sets of flat plates spaced between or intermeshing with each other with sufficient clearance to insure that the plates of one set will not touch the plates of the other set in operation, one of the sets being stationary and constituting the stator and the other of the sets being secured together and being rotary to different desired positions relatively to the stator, and constituting the rotor.

It is the purpose of my invention to provide a condenser construction of the kind described in which the rotor shall be so mounted and connected to the stator that its support is positive mechanically, and yet that the mounting plates employed shall be separated a substantial distance from each other to reduce to a minimum electrostatic action between them; also that the rotor mounting plate or plates shall be connected to the stator mounting plate or plates by high strength dielectric material in a manner that will not only introduce a minimum of capacitive loss but also afford adjustability of the parts and positively support the rotor mounting plate or plates in desired adjustment from the stator mounting plate or plates, to insure a desired relation of the rotor plates to the stator plates. By my invention I also provide an adjustable bearing or bearings for the rotor, the adjustment being two fold, first to permit adjustment of the rotor plates laterally relatively to the stator plates and second to compensate for wear of the bearings.

My invention will best be understood by reference to the accompanying drawings showing preferred embodiments thereof, in which Fig. 1 shows my condenser construction in front end elevation, Fig. 2 is a plan view of the parts shown in Fig. 1, Fig. 3 is a sectional view of the parts shown in Fig. 2 taken along the line 3—3.

Fig. 4 is a detail sectional view of a modified spacing means for mounting the condenser plates, Fig. 5 shows in a view similar to Fig. 2 a condenser provided with bearings for the rotor at both ends instead of at the front end only as shown in Fig. 2, and Fig. 6 is an end view of the rotor mounting plate employed on the rear end of the construction shown in Fig. 5.

Similar numerals refer to similar parts throughout the several views.

As shown in Figs. 1 and 2, my construction consists of a first set of condenser plates 10 of thin metal forming the stator of the condenser, these plates being equally spaced by collars 11 on rods 12 by which the plates and collars may be securely clamped together. The rods 12 support the stator assembly from a stator mounting plate 13, which preferably is of metal and disposed a substantial distance from the stator plates to reduce to a minimum the capacitive action of the mounting plate. I find it desirable to secure the plates 10 and collars 11 together more securely than can be done by screw clamping means or riveting, and to this end I solder the plates and collars together where the material of the plates will permit such an operation, for example with brass plates, or where the plates are of material not readily soldered, for example aluminum, I secure the plates and collars together by some other action of heat, for example fusing or electric welding. The result is a unitary structure, the plates of which are positively held in desired relation to each other, said plates being connected together much more perfectly electrically than is possible by simply pressing the plates and collars against each other.

The rotor assembly consists of a second set of flat metal plates 14 mounted on a shaft 15 and held in separated relation by collars 16, the spacing of the plates 14 being the same as the spacing of the plates 10. The plates 14 are preferably secured to the collars and shaft to form a unitary structure in the same manner as described for the stator assembly. While the rotor plates may have any desired outline, I prefer that their outer edges shall be in the form of logarithmic curves about the axis of the shaft to produce straight line variation of the condenser, that is to say, equal angular movements of the rotor for equal changes in capacity of the condenser throughout its range. The shape of the rotor plates referred to readily facilitates providing a stop for movement in each direction of the rotor consisting of a collar 17 of insulating material engaged by one edge of the corresponding rotor plate with the rotor in its position of maximum capacity indicated in Fig. 1 and the other edge of said rotor plate when the rotor plates are swung entirely from between the corresponding stator plates to a position of minimum capacity of the condenser.

The rotor assembly is rotatably supported by a rotor mounting plate 18 located substantially in the plane of the stator mounting plate 13. The mounting plate 18 is provided with a depending central portion 19 through which a threaded sleeve 20 extends in threaded engagement with said depending portion, in which it is positively held in any desired position by a locking nut 21. The sleeve 20, as more clearly shown in Fig. 3, is provided with a taper bore fitting correspondingly tapered portions $15^a$ and $15^b$ carried by the shaft 15, the angle of these tapers being relatively small so that a snug turning engagement may readily be provided between the shaft and the sleeve without exerting considerable end thrust on the shaft 15. A further advantage of the comparatively small angle of taper is that the portions $15^a$ and $15^b$ may be separated a substantial distance and thus provide a considerable length of bearing surface, without increasing the diameter of the large end of the taper to a prohibitive dimension. In this manner the shaft 15 requires a bearing at but one of its ends as indicated in Fig. 2, unless the condenser is required to have large capacity. The tapered bearing surface on the shaft 15 is purposely divided into two portions $15^a$ and $15^b$ separated from each other, to reduce the surface of engagement between the sleeve and shaft and to thus reduce the turning friction of the shaft during operation of the rotor.

The larger end of the tapered bearing surface of the shaft is located at the rear end of the sleeve 20 and is provided with a shoulder $15^c$ engaged by the forked end of a flat spring plate 22 held against the shoulder by a screw 23 threaded into the rotor mounting plate 18, the head of said screw 23 being of sufficient diameter to nearly engage the body portion of the shaft 15 and thus overlap to a certain extent the shoulder $15^c$ at the inner end of the bearing surface of the shaft. This construction provides that the bearing surfaces may be held together with any desired end pressure on the shaft, that the end pressure is sufficiently yielding to hold the screw 23 against back rotation and to insure a smooth frictional engagement between the bearing surfaces permitting ready turning of the shaft 15 and yet retaining said shaft and rotor in any particular adjustment. A second screw 24 extends through the spring plate 22 into the rotor mounting plate 18 to prevent edge engagement between the spring plate 22 and the shaft 15 and to positively secure the upper portion of the spring plate to the mounting plate. The spring plate 22 is preferably extended upwardly as indicated at $22^a$ to form the rotor terminal of the condenser.

As indicated in Figs. 2 and 3 the threaded sleeve 20 is extended sufficiently towards the front end of the shaft 15 to form a mounting means for the condenser, which may be positively held in desired position on a panel or other support by the nuts 25 on said sleeve. It will be observed that to afford a convenient mounting means for the condenser requires a substantial length for the sleeve 20 and as the tapered bearing surfaces of the shaft are contained within the sleeve, the entire length of the sleeve is available for these bearing surfaces and thus a relatively long bearing support is provided for the shaft without requiring a greater length of the sleeve than is required for mounting purposes.

The stator mounting plate 13 is preferably provided with a clearance $13^a$ concentric with the lower edge of the depending portion 19 of the rotor mounting plate to separate the edges of the two mounting plates a substantial distance and the adjacent edges of the mounting plates may be beveled somewhat as indicated at $13^a$ to increase the separation to a maximum without reducing the strength of the stator mounting plate.

The rotor mounting plate 18 is supported from the stator mounting plate 13 by means of two substantial parallel rods 26 of suitable insulating material, extending in substantially parallel relation and substantially in the plane of the mounting plates through clamping portions $13^b$ and $18^b$ on the mounting plates 13 and 18 respectively. While the rods 26 may be of any desired cross section, I prefer, in order to simplify the construction, to make them cylindrical and the clamping portions $13^b$ and $18^b$ are for convenience of construction, given the form of slotted bosses carried by the mounting plates having bores fitting the rods 26. Suitable clamping screws $13^c$ and $18^c$ are provided to tighten the clamping portions $13^b$ and $18^b$ respectively against the rods 26. While the clamping portions $13^b$ and $18^b$ are shown as integral with the mounting plates 13 and 18 respectively, it will be understood they may have any equivalent construction that will securely clamp the rods 26 as described.

The rods 26 may be of any suitable insulating material, but I find it advisable that the material employed shall be relatively stiff and rigid, that is shall not be deformed by temperature changes, that it shall not be affected chemically by moisture conditions in the atmosphere and that it shall have a minimum reactive effect to the electrostatic field provided by the operation of the condenser. While it is possible that other materials, for example hard rubber, will serve the purpose satisfactorily, I prefer to employ glass as the material from which to construct these rods 26. Quartz is another material ideally adapted for this purpose, but on account of its relatively high cost and the difficulty of machining and working it, it is not as well adapted for the purpose commercially as glass is.

As a result of the construction described, it will appear that the rotor assembly may readily be moved towards or away from the stator assembly by adjustment of the clamping devices on the rods 26; also that by adjustment of the sleeve 20 in the mounting plate 18, the rotor plates 14 may be accurately spaced between the stator plates 10; also that as the bearing surface of the shaft may wear from time to time, the wear may be taken up and if necessary the rotor plates may again be adjusted relatively to the stator plates. In this way I provide means for accurately maintaining the rotor plates in proper relation to the stator plates to secure their most efficient action.

In the construction illustrated in Fig. 4 I indicate a modified means for spacing the stator plates. In this construction the stator plates 10$^a$ have formed from their outer edge portions lugs 10$^b$ and 10$^c$ extending perpendicularly to the planes of the plates and of a length equal to the thickness of the collars 11, which collars are replaced by said lugs in the construction of Fig. 4. The edges of the lugs and the plates are preferably secured together by the action of heat, as for example by soldering or otherwise as above referred to and the plates are thus united to form a unitary structure which may be supported as before by rods 12 from the stator mounting plate.

While the construction above described is found to serve admirably for condensers of small or medium size, for example up to say 23 plate condensers, where large condensers are required, for example 43 plate or 63 plate condensers. I find it advisable to support the rotor shaft at both of its ends as indicated in Fig. 5. In this construction the shaft 15$^d$ is supported at its front end in the manner illustrated in Figs. 1, 2 and 3, and at its rear end it is extended somewhat beyond the rotor assembly as indicated at 15$^e$. The stator mounting rods 12$^a$ are extended rearwardly from the stator plates to support mounting plates 13$^d$ and 18$^d$ similar to the mounting plates 13 and 18, said mounting plates being secured together by rods 26$^d$ in the same manner described above for securing the mounting plates 13 and 18 together. The only difference in the rear support of the shaft from the front support above described, is that the mounting plate 18$^d$ has extending therethrough a screw 27 in axial alignment with the shaft 15$^d$, the inner end of this screw being beveled as indicated to engage a correspondingly beveled bore in the end of the shaft extension 15$^e$. The screw 27 is provided with a locking nut 28 to hold it in any desired adjustment and its beveled end is of sufficiently large angle to prevent binding engagement with the shaft. With this construction, the front or main bearing of the shaft 15$^d$ is adjusted as above described and then the screw 27 is moved into engagement with the shaft extension 15$^e$ until it positively supports said extension against lateral deflection, without however, materially increasing the end thrust on the shaft over that produced by the adjustment of the front bearing of said shaft, and the screw 27 is then locked in this position of adjustment by the nut 28. Any wear that may occur at the rear bearing of the shaft 15$^d$ may be readily taken up by adjustment of the screw 27 and nut 28. The rear mounting plates are preferably separated from the stator assembly substantially the same distance as the front mounting plates.

In the specification and claims I refer to the mounting plates as being separated from the stator assembly and from each other a substantial distance, and by this expression I mean a sufficient distance to reduce the electrostatic effect of the field of the condenser in use on the mounting plates to zero or as nearly approaching this condition as is practicable with commercial constructions. In the claims I refer to the rods connecting the mounting plates at either end of the condenser as being of high dielectric strength and by this expression I mean that the rods are of material having the electrical characteristics above referred to in connection with describing the purpose and function of these rods. In the claims I also refer to one of the bearings of the rotor assembly as being a through bearing, meaning thereby the bearing of the rotor shaft extending entirely through the sleeve above described as distinguished from the rear end bearing illustrated in Figs. 5 and 6.

As a result of the construction above described, it will appear that I provide a condenser in which losses due to leakage and undesirable inductive effects, are reduced to a minimum, also a construction in which all of the necessary adjustments to insure accuracy of operation of the condenser, may readily be made, as well as provision for maintaining the parts in any said desired adjustment; also that the construction is strong and rigid mechanically and not liable to be easily put out of adjustment when in use.

While I have shown my invention in the particular embodiment above described, it will be understood that I do not limit myself to this exact construction as I may employ equivalents known to the art at the time of the filing of this application without departing from the scope of the appended claims.

What I claim is:

1. In a variable condenser, the combination of spaced stator plates, spaced rotor plates intermediate said stator plates, a shaft supporting said rotor plates for rotary movement, a first mounting plate at one end of the condenser substantially parallel with said stator plates and secured thereto at a substantial distance therefrom, a second mounting plate substantially in the plane of said first mounting plate and substantially separated therefrom and carrying a bearing for said shaft, and rods of high dielectric strength securing said mounting plates together to maintain said stator and rotor plates in spaced relation from each other.

2. In a variable condenser, the combination of spaced stator plates, spaced rotor plates intermediate said stator plates, a shaft supporting said rotor plates for rotary movement, a first mounting plate at one end of the condenser substantially parallel with said stator plates and secured thereto at a substantial distance therefrom, a second mounting plate substantially in the plane of said first mounting plate and substantially separated therefrom and carrying a bearing for said shaft, rods of high dielectric strength securing said mounting plates together to maintain said stator and rotor plates in spaced relation from each other, said bearing comprising an externally threaded sleeve threaded through said second mounting plate, a nut on said sleeve for locking it in desired position in said second mounting plate, and devices preventing longitudinal movement of said shaft through said sleeve.

3. In a variable condenser, the combination of spaced stator plates, spaced rotor plates intermediate said stator plates, a shaft supporting said rotor plates for rotary movement, a first mounting plate at one end of the condenser substantially parallel with said stator plates and secured thereto at a substantial distance therefrom, a second mounting plate substantially in the plane of said first mounting plate and substantially separated therefrom and carrying a bearing for said shaft, rods of high dielectric strength securing said mounting plates together to maintain said stator and rotor plates in spaced relation from each other, said bearing comprising an externally threaded sleeve threaded through said second mounting plate, a nut on said sleeve for locking it in desired position in said second mounting plate, and devices preventing longitudinal movement of said shaft through said sleeve, said sleeve projecting outwardly from said second mounting plate to form a mounting means for said condenser.

4. In a variable condenser, the combination of spaced stator plates, spaced rotor plates intermediate said stator plates, a shaft supporting said rotor plates for rotary movement, a first mounting plate at one end of the condenser substantially parallel with said stator plates and secured thereto at a substantial distance therefrom, a second mounting plate substantially in the plane of said first mounting plate and substantially separated therefrom and carrying a bearing for said shaft, rods of high dielectric strength securing said mounting plates together to maintain said stator and rotor plates in spaced relation from each other, devices preventing longitudinal movement of said shaft in said bearing, said bearing having a tapered bore of small angle and said shaft having a correspondingly tapered portion, and a spring member holding said tapered portions together in snug turning engagement.

5. In a variable condenser, the combination of spaced stator plates, spaced rotor plates intermediate said stator plates, a shaft supporting said rotor plates for rotary movement, a first mounting plate at one end of the condenser substantially parallel with said stator plates and secured thereto at a substantial distance therefrom, a second mounting plate substantially in the plane of said first mounting plate and substantially separated therefrom and carrying a bearing for said shaft, rods of high dielectric strength securing said mounting plates together to maintain said stator and rotor plates in spaced relation from each other, devices preventing longitudinal movement of said shaft in said bearing, said bearing having a tapered bore of small angle and said shaft having a correspondingly tapered portion terminating at its larger end in a shoulder, a flat spring resting against said shoulder and a screw for pressing said spring with desired tension against said shoulder.

6. In a variable condenser, the combination of spaced stator plates, spaced rotor plates intermediate said stator plates, a shaft supporting said rotor plates for rotary movement, a first mounting plate at one end of the condenser substantially parallel with said stator plates and secured thereto at a substantial distance therefrom, a second mounting plate substantially in the plane of said first mounting plate and substantially separated therefrom and carrying a bearing for said shaft, rods of high dielectric strength securing said mounting plates together to maintain said stator and rotor plates in spaced relation from each other, said bearing comprising an externally threaded sleeve threaded through said second mounting plate, a nut on said sleeve for locking it in desired position in said second mounting plate, said bearing having a tapered bore of small angle and said shaft having a correspondingly tapered portion, and a device holding said tapered portions together in snug turning engagement.

7. In a variable condenser, the combination of spaced stator plates, spaced rotor plates intermediate said stator plates, a shaft supporting said rotor plates for rotary movement, a first mounting plate at one end of the condenser substantially parallel with said stator plates and secured thereto at a substantial distance therefrom, a second mounting plate substantially in the plane of said first mounting plate and substantially separated therefrom and carrying a bearing for said shaft, rods of high dielectric strength securing said mounting plates together to maintain said stator and rotor plates in spaced relation from each other, said bearing comprising an externally threaded sleeve threaded through said second mounting plate, a nut on said sleeve for locking it in desired position in said second mounting plate, said bearing having a tapered bore of small angle and said shaft having a correspondingly tapered portion terminating at its larger end in a shoulder, a flat spring resting against said shoulder, and a screw for pressing said spring with desired tension against said shoulder.

8. In a variable condenser, the combination of spaced stator plates, spaced rotor plates intermediate said stator plates, a shaft supporting said rotor plates for rotary movement, a first mounting plate at one end of the condenser substantially parallel with said stator plates and secured thereto at a substantial distance therefrom, a second mounting plate substantially in the plane of said first mounting plate and substantially separated therefrom and carrying a bearing for said shaft, rods of high dielectric strength securing said mounting plates together to maintain said stator and rotor plates in spaced relation from each other, said bearing comprising an externally threaded sleeve threaded through said second mounting plate, a nut on said sleeve for locking it in desired position in said second mounting plate, said bearing having a tapered bore of small angle and said shaft having a correspondingly tapered portion terminating at its larger end in a shoulder, a flat spring resting against said shoulder, and a screw for pressing said spring with desired tension against said shoulder, said spring constituting the rotor terminal of the condenser.

9. In a variable condenser, the combination of spaced stator plates, spaced rotor plates intermediate said stator plates, a shaft supporting said rotor plates for rotary movement, a first mounting plate at one end of the condenser substantially parallel with said stator plates and secured thereto at a substantial distance therefrom, a second mounting plate substantially in the plane of said first mounting plate and substantially separated therefrom and carrying a bearing for said shaft, rods of high dielectric strength securing said mounting plates together to maintain said stator and rotor plates in spaced relation from each other, said bearing comprising an externally threaded sleeve threaded through said second mounting plate, a nut on said sleeve for locking it in desired position in said second mounting plate, said bearing having a tapered bore of small angle and said shaft having a correspondingly tapered portion terminating at its larger end in a shoulder, a flat spring resting against said shoulder, and a screw for pressing said spring with desired tension against said shoulder, said screw having a head overlapping at one edge of said shoulder.

10. As a mounting means for a variable condenser, a stator mounting plate, a rotor mounting plate substantially in the plane of said stator mounting plate, and retaining rods of high dielectric strength secured to said plates.

11. As a mounting means for a variable condenser, a stator mounting plate, a rotor mounting plate substantially in the plane of said stator mounting plate, retaining rods of high dielectric strength extending into seats therefor on said mounting plates, said mounting plates having clamping portions at said seats, and screws for holding said clamping portions tightly against said rods.

12. As a mounting means for a variable condenser, a stator mounting plate, a rotor mounting plate substantially in the plane of said stator mounting plate, retaining rods of high dielectric strength extending into seats therefor on said mounting plates, said mounting plates having clamping portions at said seats, and screws for holding said clamping portions tightly against said rods, said rods being substantially in the plane of said mounting plates.

In witness whereof, I hereunto subscribe my name this 23rd day of October, A. D. 1924.

HAROLD E. BECK.